US012147717B2

(12) United States Patent
Saito

(10) Patent No.: US 12,147,717 B2
(45) Date of Patent: Nov. 19, 2024

(54) SERVER AND NON-TRANSITORY COMPUTER-READABLE RECORDING MEDIUM FOR COMMUNICATION SYSTEM FOR PERFORMING AUTHENTICATION USING AUTHENTICATION INFORMATION OBTAINED FROM COMMUNICATION DEVICE AND BASED ON AUTHENTICATION INFORMATION RECEIVED BY TERMINAL DEVICE

(71) Applicant: Brother Kogyo Kabushiki Kaisha, Nagoya (JP)

(72) Inventor: Ken Saito, Tokoname (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/163,363

(22) Filed: Feb. 2, 2023

(65) Prior Publication Data

US 2023/0266931 A1 Aug. 24, 2023

(30) Foreign Application Priority Data

Feb. 22, 2022 (JP) .................. 2022-026137

(51) Int. Cl.
G06F 3/12 (2006.01)
(52) U.S. Cl.
CPC .......... G06F 3/1222 (2013.01); G06F 3/1204 (2013.01); G06F 3/1238 (2013.01)
(58) Field of Classification Search
CPC .... G06F 3/1222; G06F 3/1204; G06F 3/1238; G06F 3/12; G06F 3/1255; G06F 3/1293;

(Continued)

(56) References Cited

U.S. PATENT DOCUMENTS

2016/0292550 A1* 10/2016 Kawai .................. G06K 15/102
2018/0046534 A1* 2/2018 Yoshida ................ G06F 3/1259
2018/0285042 A1* 10/2018 Kato .................. H04N 1/00228

FOREIGN PATENT DOCUMENTS

JP 2016-193592 A 11/2016

* cited by examiner

Primary Examiner — Iriana Cruz
(74) Attorney, Agent, or Firm — KENEALY VAIDYA LLP

(57) ABSTRACT

A server has a controller configured to perform obtaining, from the administrator's device, a first request for information associated with an administrator of the communication device, transmitting, in response to the first request, management information associated with the administrator, to the administrator's device, obtaining the management information transmitted by the terminal device based on the management information received by the administrator's device, obtaining, from the terminal device, an information request for information for use of the communication device, second transmitting, to the terminal device, authentication information for use of the communication device, obtaining the authentication information from the communication device, the authentication information obtained from the communication device being information transmitted by the communication based on the authentication information received by the terminal device, and associating, based on acquisition of the authentication information, the management information obtained from the terminal device with identification information of the communication device.

10 Claims, 11 Drawing Sheets

(58) Field of Classification Search
CPC .. G06F 3/121; H04N 1/00244; H04N 1/4413; G03G 15/0863; G03G 15/553
See application file for complete search history.

631

| SUBSCRIBER IDENTIFIER LID | PASSWORD PW | REGISTRATION IDENTIFIER CID | SUBSCRIPTION IDENTIFIER ZID | MANAGEMENT IDENTIFIER UID |
|---|---|---|---|---|
| LID1 | PW1 | CID1 | ZID1 | CID1 |
| ⋮ | ⋮ | ⋮ | ⋮ | ⋮ |

| SUBSCRIPTION IDENTIFIER ZID | PLAN PL | DEVICE IDENTIFIER DID | DELIVERY DESTINATION ADR |
|---|---|---|---|
| ZID1 | PL1 | DID1 | ADR1 |
| ZID1 | PL1 | DID2 | ADR2 |
| ⋮ | ⋮ | ⋮ | ⋮ |

| REGISTRATION IDENTIFIER CID | DEVICE IDENTIFIER DID |
|---|---|
| CID1 | DID1 |
| CID1 | DID2 |
| ⋮ | ⋮ |

FIG. 2C

| 634 | SUBSCRIPTION IDENTIFIER ZID | PLAN PL | REGISTRATION IDENTIFIER CID | DELIVERY DESTINATION ADR |
|---|---|---|---|---|
| | ZID1 | PL1 | CID2 | ADR3 |

FIG. 6A

| 533 | REGISTRATION IDENTIFIER CID | PIN |
|---|---|---|
| | CID2 | PIN1 |

FIG. 6B

| 533 | REGISTRATION IDENTIFIER CID | DEVICE IDENTIFIER DID |
|---|---|---|
| | CID2 | DID3 |

FIG. 6C

| 632 | SUBSCRIPTION IDENTIFIER ZID | PLAN PL | DEVICE IDENTIFIER DID | ADDRESS ADR |
|---|---|---|---|---|
| | ZID1 | PL1 | DID1 | ADR1 |
| | ZID1 | PL1 | DID2 | ADR2 |
| R1 → | ZID1 | PL1 | DID3 | ADR3 |
| | ⋮ | ⋮ | ⋮ | ⋮ |

FIG. 6D

| 531 | REGISTRATION IDENTIFIER CID | DEVICE IDENTIFIER DID |
|---|---|---|
| | CID1 | DID1 |
| | CID1 | DID2 |
| R2 → | CID1 | DID3 |
| | ⋮ | ⋮ |

FIG. 6E

| 634A | SUBSCRIBER IDENTIFIER LID | SUBSCRIPION IDENTIFIER ZID | PLAN PL | REGISTRATION IDENTIFIER CID | ADDRESS ADR |
|---|---|---|---|---|---|
| | LID1 | ZID1 | PL1 | CIDa | ADRa |

| 533A | REGISTRATION IDENTIFIER CID | PIN |
|---|---|---|
| | CIDa | PINa |

FIG. 7A

| 634B | SUBSCRIBER IDENTIFIER LID | SUBSCRIPION IDENTIFIER ZID | PLAN PL | REGISTRATION IDENTIFIER CID | ADDRESS ADR |
|---|---|---|---|---|---|
| | LID1 | ZID1 | PL1 | CIDb | ADRb |

| 533B | REGISTRATION IDENTIFIER CID | PIN |
|---|---|---|
| | CIDb | PINb |

FIG. 7B

| 634A | SUBSCRIBER IDENTIFIER LID | SUBSCRIPION IDENTIFIER ZID | PLAN PL | DEVICE IDENTIFIER DID | ADDRESS ADR |
|---|---|---|---|---|---|
| | LID1 | ZID1 | PL1 | DIDa | ADRa |

| 533A | REGISTRATION IDENTIFIER CID | DEVICE IDENTIFIER DID |
|---|---|---|
| | CIDa | DIDa |

FIG. 7C

| 634B | SUBSCRIBER IDENTIFIER LID | SUBSCRIPION IDENTIFIER ZID | PLAN PL | DEVICE IDENTIFIER DID | ADDRESS ADR |
|---|---|---|---|---|---|
| | LID1 | ZID1 | PL1 | DIDb | ADRb |

| 533B | REGISTRATION IDENTIFIER CID | DEVICE IDENTIFIER DID |
|---|---|---|
| | CIDb | DIDb |

FIG. 7D

| 632 | SUBSCRIPTION IDENTIFIER ZID | PLAN PL | DEVICE IDENTIFIER DID | DELIVERY DESTINATION ADR |
|---|---|---|---|---|
| | ZID1 | PL1 | DID1 | ADR1 |
| | ZID1 | PL1 | DID2 | ADR2 |
| R1a → | ZID1 | PL1 | DIDa | ADRa |
| R1b → | ZID1 | PL1 | DIDb | ADRb |
| | ⋮ | ⋮ | ⋮ | ⋮ |

FIG. 8A

| 531 | REGISTRATION IDENTIFIER CID | DEVICE IDENTIFIER DID |
|---|---|---|
| | CID1 | DID1 |
| | CID1 | DID2 |
| R2a → | CID1 | DIDa |
| R2b → | CID1 | DIDb |
| | ⋮ | ⋮ |

FIG. 8B

| 634C | SUBSCRIBER IDENTIFIER LID | SUBSCRIPION IDENTIFIER ZID | PLAN PL | DEVICE IDENTIFIER DID | ADDRESS ADR | PIN |
|---|---|---|---|---|---|---|
| | LID1 | ZID1 | PL1 | DIDa | ADRa | PINa |

| 533C | REGISTRATION IDENTIFIER CID | PIN | DEVICE IDENTIFIER DID |
|---|---|---|---|
| | CIDc | PINa | DIDa |

FIG. 9D

| 634D | SUBSCRIBER IDENTIFIER LID | SUBSCRIPION IDENTIFIER ZID | PLAN PL | DEVICE IDENTIFIER DID | ADDRESS ADR | PIN |
|---|---|---|---|---|---|---|
| | LID1 | ZID1 | PL1 | DIDb | ADRb | PINb |

| 533D | REGISTRATION IDENTIFIER CID | PIN | DEVICE IDENTIFIER DID |
|---|---|---|---|
| | CIDc | PINb | DIDb |

FIG. 9E

SERVER AND NON-TRANSITORY COMPUTER-READABLE RECORDING MEDIUM FOR COMMUNICATION SYSTEM FOR PERFORMING AUTHENTICATION USING AUTHENTICATION INFORMATION OBTAINED FROM COMMUNICATION DEVICE AND BASED ON AUTHENTICATION INFORMATION RECEIVED BY TERMINAL DEVICE

REFERENCE TO RELATED APPLICATIONS

This application claims priority from Japanese Patent Application No. 2022-026137 filed on Feb. 22, 2022. The entire content of the priority application is incorporated herein by reference.

BACKGROUND ART

The present disclosures relate to a technique for managing a communication system.

Communication devices such as printers and scanners are typically configured to communicate with other communication devices via networks. For managing such a communication device, a server can be used. For example, there is known a conventional communication system having a PC (personal computer), an information management server and a printer. In such a communication system, the PC requests the information management server to issue a PIN code. Then, the information management server issues the PIN code, and transmits code display information for displaying the PIN code on a display to the PC. On a display of a printer connected to the PC, a code registration screen is displayed. The printer then transmits code information related to the PIN code filled out in an input field of the code registration screen as well as a model name and a serial number of the printer to the information management server. When receiving the code information, the serial number and the model name, the information management server extracts account data including the PIN code corresponding to the code information from a data storage area, and stores the extracted account data in association with the serial number and the model name as printer information in the data storage area.

DESCRIPTION

The communication devices may be used in various situations. For example, a user of a communication device could be an administrator thereof. In such a case, the management of the communication devices needs to be improved.

According to aspects of the present disclosures, there is provided a server for a communication system including an administrator's device, a terminal device and a communication device, the server being communicatable with the administrator's device, the terminal device and the communication device, the server has a controller having hardware. The controller is configured to perform first obtaining, from the administrator's device, a first request indicating a request for information associated with an administrator of the communication device, first transmitting, in response to the first request, management information which is information associated with the administrator to the administrator's device, second obtaining, from the terminal device, the management information, the management information obtained from the terminal device being information transmitted by the terminal device based on the management information received by the administrator's device, third obtaining, from the terminal device, an information request indicating a request for information for use of the communication device, second transmitting, to the terminal device, authentication information that is information for use of the communication device, fourth obtaining the authentication information from the communication device, the authentication information obtained from the communication device being information transmitted by the communication based on the authentication information received by the terminal device, and first associating, based on acquisition of the authentication information, the management information obtained from the terminal device with identification information of the communication device.

According to aspects of the present disclosures, there is provided a non-transitory computer-readable recording medium for a server for a communication system including an administrator's device, a terminal device and a communication device, the server being communicatable with the administrator's device, the terminal device and the communication device, the server has a controller having hardware. The non-transitory recording medium containing computer-executable instructions which cause, when executed by the controller, the server to perform first obtaining, from the administrator's device, a first request indicating a request for information associated with an administrator of the communication device, first transmitting, in response to the first request, management information which is information associated with the administrator to the administrator's device, second obtaining, from the terminal device, the management information, the management information obtained from the terminal device being information transmitted by the terminal device based on the management information received by the administrator's device, third obtaining, from the terminal device, an information request indicating a request for information for use of the communication device, second transmitting, to the terminal device, authentication information that is information for use of the communication device, fourth obtaining the authentication information from the communication device, the authentication information obtained from the communication device being information transmitted by the communication based on the authentication information received by the terminal device, and first associating, based on acquisition of the authentication information, the management information obtained from the terminal device with identification information of the communication device.

FIG. 2A shows an example of a registration table.

FIG. 2B shows an example of a delivery table.

FIG. 2C shows an example of a device table.

FIG. 6A shows an example of a temporary delivery table.

FIG. 6B shows an example of a temporary device table.

FIG. 6C shows an example of an updated temporary device table.

FIG. 6D shows an example of an updated temporary delivery table.

FIG. 6E shows an example of an updated delivery table.

FIGS. 7A-7D show examples of temporary delivery tables and temporary device tables.

FIGS. 8A and 8B show an example of updated tables.

FIG. 9A illustrates a changed portion of the registration process.

FIGS. 9B-9E show examples of the temporary delivery tables and temporary device tables.

A. EMBODIMENT

A1. System Configuration

Figure 1:
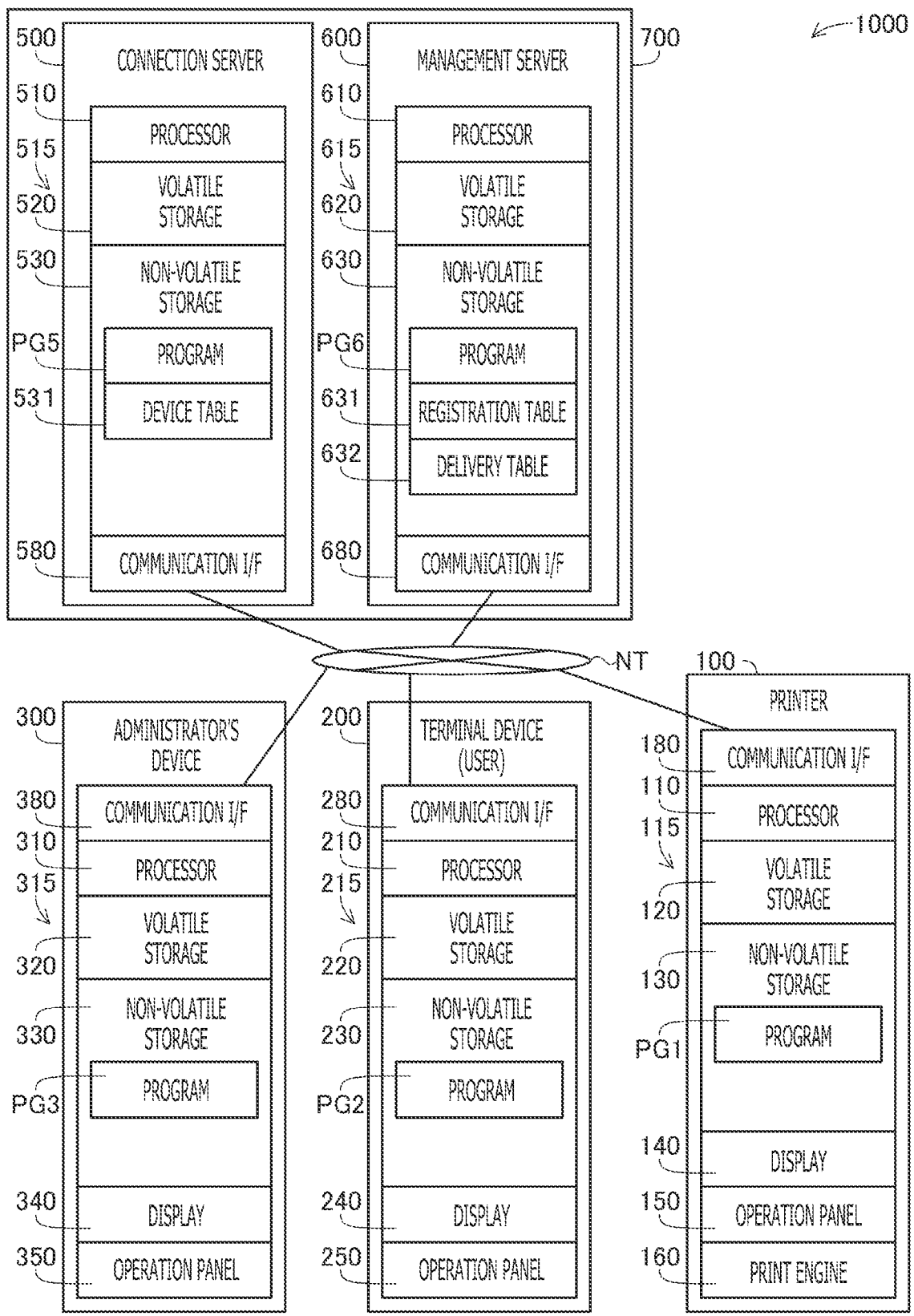
FIG. 1 is a block diagram of a communication system according to the present disclosures.

FIG. 1 is a block diagram showing a system configuration of a communication system 1000. The communication system 1000 includes a printer 100, a terminal device 200, an administrator's device 300, and a communication process server system 700. The communication process server system 700 includes a connection server 500 and a management server 600. In the following description, the communication process server system 700 may be simply referred to as a "processing server" 700. According to the present embodiment, the processing server 700 is provided by a printing service provider. The printing service provider provides the printers 100 to subscribers of the printing service.

The management server 600 manages services associated with the printer 100. According to the present embodiment, the management server 600 is configured to manage the delivery of consumables used by the printer 100. The printer 100 has a print engine 160. The print engine 160 is a printing device configured to print an image using a printing material (e.g., toner or ink) on a sheet (which is an example of a printing medium) using a particular printing method (e.g., a laser or inkjet printing method). In the present embodiment, it is assumed that the print engine 160 is a printing device employing the inkjet printing method using ink. The management server 600 performs a process of delivering refill ink to a delivery destination that is associated with the printer 100 in advance. For example, the management server 600 transmits, to a distributor server (not shown), instructions for shipping ink to the delivery destination. The distributor server will proceed with an ink shipment procedure according to the instructions. The management server 600 may perform the process for ink delivery in response to an order from a user of the printer 100. Alternatively, the management server 600 may obtain the remaining amount of ink from the printer 100 and perform the process for the ink delivery when the remaining amount is low.

The printing services that a subscriber can subscribe to may include a variety of services, such as a subscription service that allows the subscriber to print up to a designated number of copies each month. When a subscription service is subscribed, the management server 600 may assign a new number of printable sheets to the printer 100 each month. The printer 100 allows the user to print up to the above number of printable sheets.

The connection server 500 establishes a continuous connection with the printer 100. Any method of maintaining the continuous connection may be used. For example, the connection server 500 and the printer 100 establish a communication session for the continuous connection according to an XMPP (Extensible Messaging and Presence Protocol). The communication between the printer 100 and the management server 600 is performed via the connection server 500.

The administrator's device 300 is a terminal device of the administrator of the printer 100, and is, for example, a computer (e.g., a smartphone, a personal computer, or the like). The administrator of the printer 100 may be any of various types of people. When the printer 100 is used in a home, the administrator of the printer 100 could be a member of the family (e.g., a father, a mother or the like). When a company subscribes to the printing service, the administrator may be an employee.

The terminal device 200 is a terminal device of a user of the printer 100, and is, for example, a computer (e.g., a smartphone, a personal computer or the like). The user of the printer 100 may be any of various types of people. The user of the printer 100 may be different from the administrator of the printer 100. For example, when the printer is used in a home, the user may be a member (e.g., a child) different from the administrator. When a company subscribes to the printing service, the user may be an employee different from the administrator. When the user works from home, the printer 100 may be installed at the home of the user, not an office.

In the present embodiment, the user of the printer 100 registers the printer 100 in the management server 600 so as to be managed by the management server 600. The management server 600 accepts the registration of the printer 100 with the approval of the administrator. As will be described, the processing server 700 uses authentication information so that the printer 100 can be registered easily, even if the user is different from the administrator.

The devices 100, 200, 300, 500 and 600 are connected to a network NT. The network NT may include the so-called Internet. Further, the network NT may include a so-called a local area network.

The printer 100 has a processor 110, a storage 115, a display 140, an operation panel 150, a print engine 160 and a communication interface 180. These components are interconnected via a bus, as used in well-known devices. The storage 115 includes a volatile storage 120 and a non-volatile storage 130. The processor 110 is a device (e.g., a CPU) configured to perform data processing. The volatile storage 120 is, for example, a DRAM, and the non-volatile storage is, for example, a flash memory.

The display 140 is a device configured to display images, and is, for example, a liquid crystal display, an organic EL display, an LED display or the like. The operation panel 150 is configured to receive user operations and includes, for example, buttons, levers, and a touch panel overlaid on the display 140. The communication interface 180 is an interface configured to communicate with other devices. For example, the communication interface 180 may include at least one of a USB interface, a wired LAN interface, and a wireless interface compliant with IEEE 802.11 standards. According to the present embodiment, the communication interface 180 is connected to the network NT.

The non-volatile storage 130 contains a program PG1. The program PG1 has been stored in the non-volatile storage 130 in advance as firmware by a manufacturer of the printer 100. The processor 110 performs various processes by executing the program PG1.

The terminal devices 200 and 300 have processors 210 and 310, storages 215 and 315, displays 240 and 340, operation panels 250 and 350, and communication interfaces 280 and 380, respectively. In each of the terminal devices 200 and 300, respective components are interconnected via a conventionally-known bus. The storages 215 and 315 include volatile storages 220 and 320, and non-volatile storages 230 and 330, respectively. The processors 210 and 310 are devices configured to perform data processing, and are, for example, CPUs, respectively. The volatile storages 220 and 320 are, for example, DRAMs and the non-volatile storages 230 and 330 are, for example, flash memories.

The displays 240 and 340 are devices configured to display images and are, for example, liquid crystal displays, organic EL displays, LED displays or the like. The operation panels 250 and 350 are devices configured to receive user operations and are, for example, buttons, levers, and touch panels overlaid on the displays 240 and 340, respectively. The communication interfaces 280 and 380 are interfaces to communicate with other devices. For example, each of the communication interfaces 280 and 380 includes at least one of a USB interface, a wired LAN interface, and a wireless interface compliant with the IEEE 802.11 standard. According to the present embodiment, the communication interfaces 280 and 380 are connected to the network NT.

The non-volatile storages 230 and 330 contain programs PG2 and PG3 for the operations of the terminal devices 200 and 300, respectively. The processors 210 and 310 perform various processes (described later) in accordance with the programs PG2 and PG3, respectively.

The servers 500 and 600 have processors 510 and 610, storages 515 and 615, and communication interfaces 580 and 680, respectively. In the server 500, the processor 510, the storage 515, and the communication interface 580 are connected with each other via a bus, and in the server 600, the processor 610, the storage 615, and the communication interface 680 are connected with each other via a bus. The storages 515 and 615 include volatile storages 520 and 620, and non-volatile storages 530 and 630, respectively. Each of the processors 510 and 620 is a device configured to perform a data processing and is, for example, a CPU. Each of the volatile storages 520 and 620 is, for example, a DRAM. Each of the non-volatile storages 530 and 630 is, for example, a flash memory. Each of the communication interfaces 580 and 680 is an interface configured to communicate with another device. For example, each of the communication interfaces 580 and 680 includes at least one of a USB interface, a wired LAN interface, and a wireless interface compliant with the IEEE802.11 standard. According to the present embodiment, each of the communication interfaces and 580 and 680 is connected to the network NT.

The non-volatile storages 530 and 630 store, in advance, programs PG5 and PG6 for the operations of the servers 500 and 600, respectively. The processors 510 and 610 perform various processes in accordance with the programs PG5 and PG6, respectively.

The non-volatile storage 530 of the connection server 500 further includes data indicating a device table 531. The non-volatile storage 630 of the management server 600 is further configured to store data indicating a registration table 631, and a delivery table 632. The registration table 631 and the delivery table 632 will be described later.

A2. Configuration of Tables

FIG. 2A shows an example of the registration table 631. The registration table 631 indicates information related to subscriptions having been registered. In the present embodiment, the registration table 631 indicates a relationship among a subscriber identifier LID, password information PW, a registration identifier CID, a subscription identifier ZID, and a management identifier UID. The subscriber identifier LID is an identifier of the subscriber of the printing service. The password information PW is information to be used for a password authentication to sign in to a webpage for management (e.g., a hashed value of a password). The registration identifier CID is an identifier of subscription registration. As will be described later, the registration identifier CID is shared by the management server 600 and the connection server 500. The subscription identifier ZID is an identifier of a subscription to the registered printing service. The management identifier UID is information used to register the printer 100. The printing service provider registers information about the subscription in the registration table 631 in response to the subscriber's subscription to the printing service. In an example shown in FIG. 2A, the relationship among a first subscriber identifier LID1, first password information PW1, a first registration identifier CID1, a first subscription identifier ZID1, and a first management identifier UID1 has been registered. It is noted that the management identifier UID is issued by the management server 600 in response to a request by the administrator of the printer 100.

FIG. 2B shows an example of the delivery table 632. The delivery table 632 shows a relationship among the subscription identifier ZID, a plan PL, a device identifier DID, and a delivery destination ADR. The subscription identifier ZID is the same as the subscription identifier ZID in the registration table 631 (see FIG. 2A). The plan PL is an identifier of a content of the subscription (e.g., a fixed price service). The device identifier DID is an identifier of a printer (e.g., the printer 100). The delivery destination ADR indicates a delivery destination, which is typically an address where the printer 100 is placed) of consumables. The management server 500 registers information related to a newly registered printer in the delivery table 632 in the registration process. The subscription identifier ZID and the plan PL are determined by the printing service provider in response to the subscription of the printing service by the subscriber. The device identifier DID is determined in advance for each printer. The delivery destination ADR is determined by the user of the printer. The delivery destination ADR is an example of device information to be associated with the printer 100.

In the example shown in FIG. 2B, the information ZID1, PL1, DID1, and ADR1 related to the first device identifier DID1 and the information ZID1, PL1, DID2, and ADR2 related to the second device identifier DID2 have been registered. The first subscription identifier ZID1 and the first plan PL1 are common to the two device identifiers DID1 and DID2. By the registration table 631 (see FIG. 2A), the first subscription identifier ZID1 is associated with the first subscriber identifier LID1. In the example shown in FIGS. 2A and 2B, two printers respectively corresponding to the two device identifiers DID1 and DID2 are associated with the single first subscriber identifier LID1.

FIG. 2C shows an example of the device table 531. The device table 531 shows a relationship between the registration identifier CID and the device identifier DID. The information in the device table 531 is registered in the registration process described later. In the example shown in FIG. 2C, a relationship between a first registration identifier CID1 and a first device identifier DID1 and a relationship between the first registration identifier CID1 and a second device identifier DID2 have been registered.

A3. Issuance Process of Management Identifier

Figure 3:
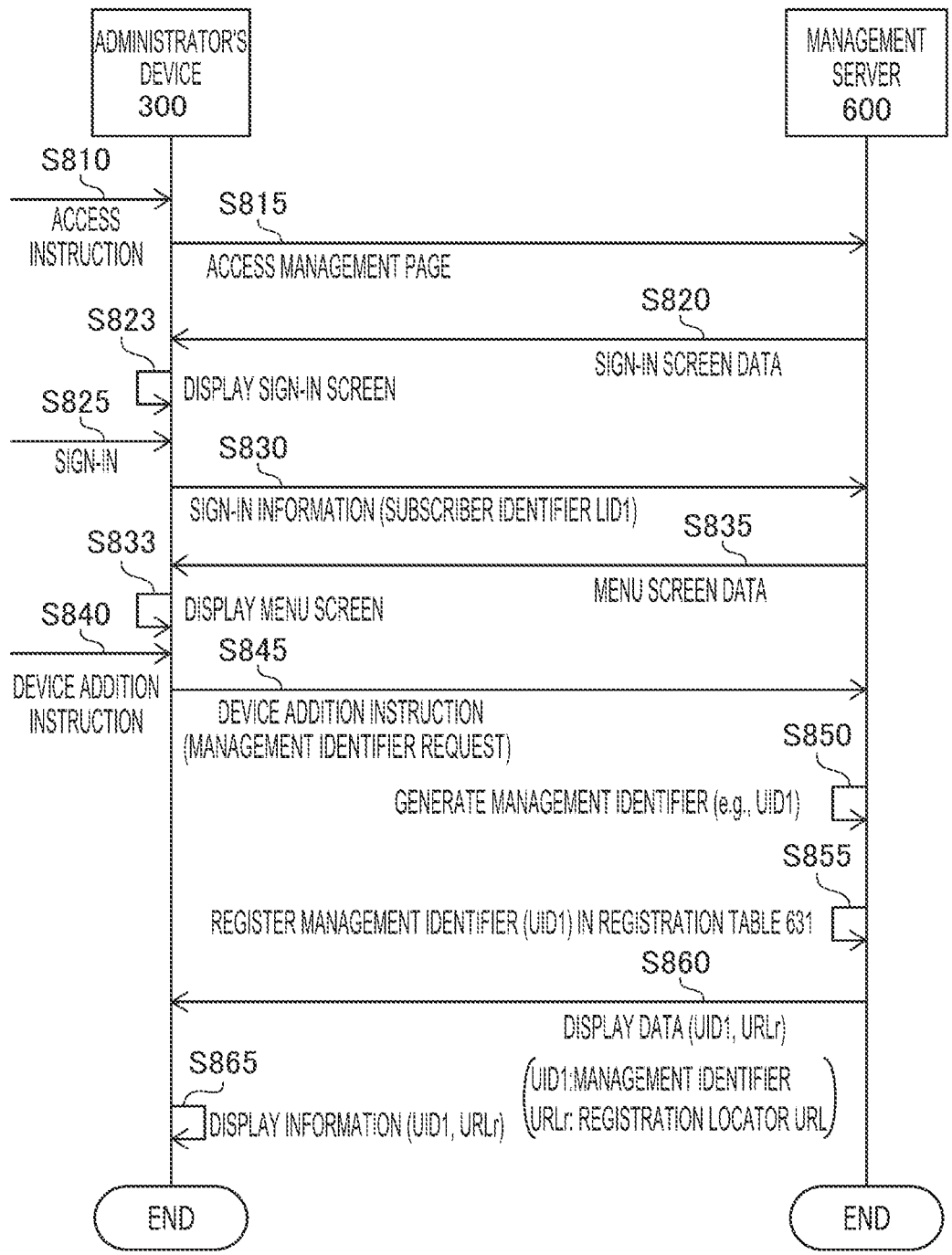
FIG. 3 is a sequence diagram illustrating an issuance process.

FIG. 3 is a sequence diagram showing an example of an issuance process for the management identifier UID (FIG. 2A). In FIG. 3, the issuance processes of the administrator's device 300 and the management server 600 are shown. The processors 310 and 610 of the devices 300 and 600 execute the issuance processes therefor, by executing the programs PG3 and PG6, respectively.

In S810, the administrator inputs an access instruction to a management page by operating the operation panel 350 of the administrator's device 300. As an input method to input the access instruction, any method can be used. For example, the administrator may input an URL of the management page via the browser running on the administrator's device 300. The URL of the management page is determined in advance. In S815, the processor 310 of the administrator's device 300 transmits a request for the management page to the management server 600 by accessing the URL of the management page. In the present embodiment, the management page is a webpage. Further, the program PG3 of the administrator's device 300 is a program of the web browser.

In S820, the processor 610 of the management server 600 transmits data indicating the webpage corresponding to the request from the administrator's device 300. According to the present embodiment, the webpage is a sign-in screen for the management. In S823, the processor 310 of the administrator's device 300 displays the sign-in screen on the display 340 (not shown) using the received data. In the present embodiment, the sign-in screen is configured such that the user input the subscriber identifier and the password for the password authentication. It is noted that a method of sign-in is not necessarily limited to the password authentication, but any other authentication method may be employed.

In S825, the administrator inputs the subscriber identifier (in this case, a first subscriber identifier LID1) by operating the operation panel of the administrator's device 300. The administrator is notified, in advance, by the subscriber of the first subscriber identifier LID1 and the password to manage the printer. In S830, the processor 310 of the administrator's device 300 transmits the data indicating the input information to the management server 600. In the following description, it is assumed that the password authentication is successful.

In S835, the processor 610 of the management server 600 transmits the data representing the webpage of the menu screen to the administrator's device 300. In S833, the processor 310 of the administrator's device 300 displays the menu screen on the display 340 using the received data.

In S840, the administrator inputs an addition instruction to add a device by operating the operation panel 350 of the administrator's device. In S845, the processor 310 of the administrator's device 300 transmits the addition instruction to the management server 600. This instruction indicates an issuance request for the management identifier.

In S850, the processor 610 of the management server 600 generates a management identifier UID. In the present embodiment, the management identifier UID is a combination of multiple characters including numerals and alphabets. The processor 610 randomly generates the combination of multiple characters (i.e., the management identifier UID) using a random number. In the following description, it is assumed that the generated management identifier UID is a first management identifier UID1.

In S855, the processor 610 registers the generated first management identifier UID1 in the registration table 631 (FIG. 2A). The processor 610 sets the management identifier UID associated with the subscriber identifier LID1 obtained in S830 to the first management identifier UID1.

In S860, the processor 610 transmits display data used to display the generated first management identifier UID1, a registration locator URLr which is the URL of the registration form on the administrator's device 300 to the administrator's device. In the present embodiment, the display data is data of a webpage which displays the information UID1 and URLr. The registration locator URLr has been determined in advance. The registration locator URLr may be a URL which has been associated, in advance, with the subscriber identifier LID or the administrator identifier UID. Alternatively, the processor 610 may determine a different URL as the registration locater URLr at every execution of the registration process. For example, the processor 610 uses a random number to generate a combination of multiple numerals, and employs a URL including the thus generated combination of multiple numbers as the registration locator URLr.

In S865, the processor 310 of the administrator's device 300 displays the first management identifier UID1 and the registration locator URLr on the display 340 using the display data received in S860. The administrator can recognize the first management identifier UID1 and the registration locator URLr by observing the display 340. Then, the process shown in FIG. 3 is terminated.

The administrator informs the user who should be allowed to register the printer with the information UID1 and URLr. In the present embodiment, the fact that the administrator notifies the user of the first management identifier UID1 means the administrator authorizes the user to register the printer. A method of notifying the user of the first management identifier UID1 may be any method. For example, an electronic notification method such as an email and/or posting on an electronic bulletin board that can be browsed by only by persons involved may be employed. Alternatively or optionally, physical methods of communication, such as mailing paper documents, may be employed. In either case, it is preferred that the communication method be configured in such a way that it is difficult for a third party to obtain the first management identifier UID1.

A4. Registration Process

Figure 4:
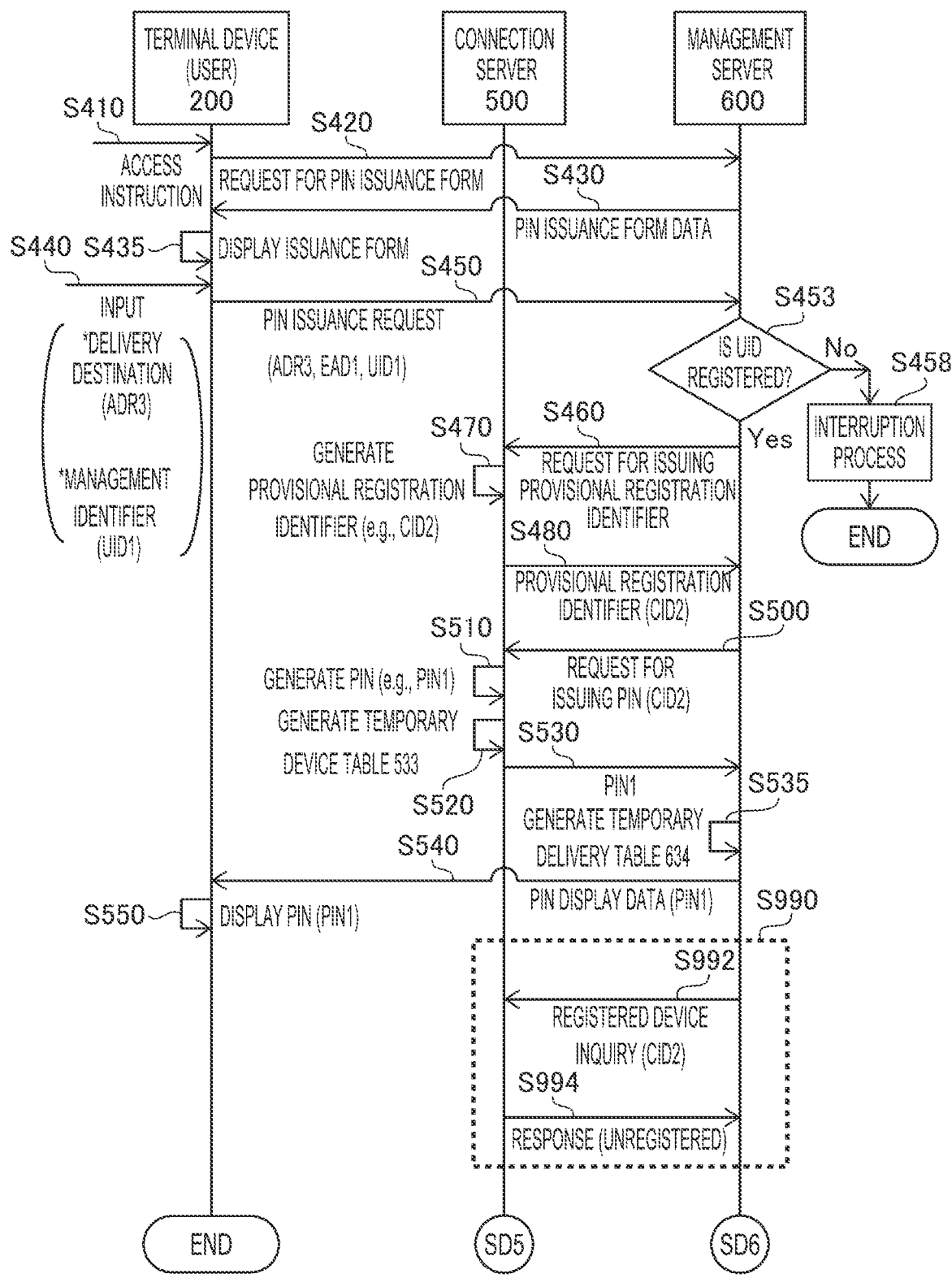
FIGS. 4-5 are sequence diagrams illustrating a registration process according to an embodiment.
Figure 5:
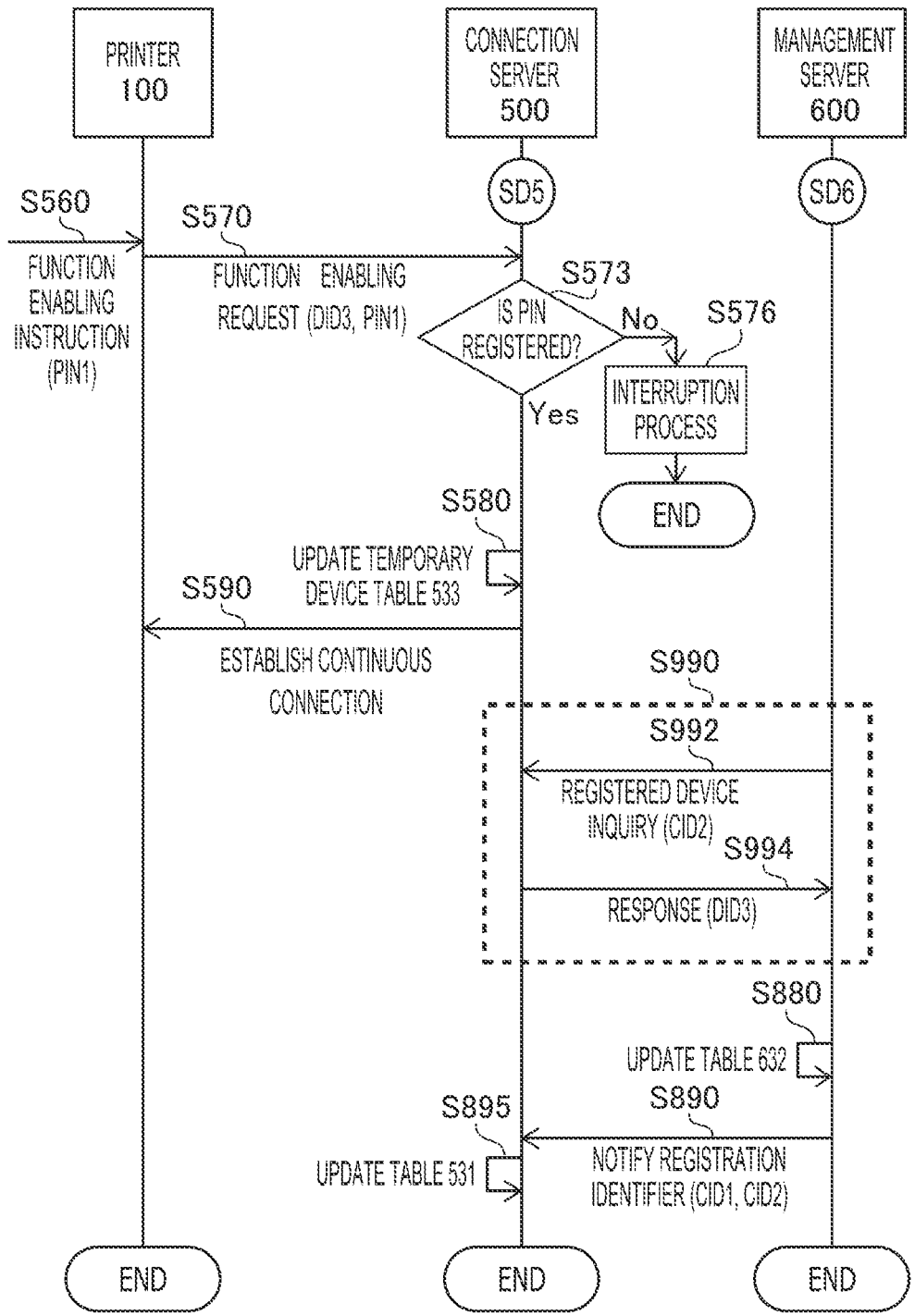

FIGS. 4-5 are sequence diagrams illustrating the registration process. The registration process proceeds in the order of FIGS. 4 and 5. The registration process is a process of registering information related to the printer 100 with the processing server 700. It is noted that, in FIGS. 4-5, processes of respective devices 100, 200, 500 and 600 are indicated. The processors 110, 210, 510 and 610 of the devices 100, 200, 500 and 600 execute programs PG1, PG2, PG5 and PG6 to perform the processes, respectively.

In S410 (FIG. 4), the user of the printer 100 inputs an access instruction to access an issuance form of the PIN by operating the operation panel 250 of the terminal device 200. In the modified embodiment, the user inputs the URL of the issuance form to the browser running on the terminal device 200. The URL of the issuance form has been determined in advance. In S420, the processor 210 of the terminal device 200 accesses the URL of the issuance form, thereby transmitting a request for the issuance form to the management server 600. In the modified embodiment, the issuance form is a web form for allowing the user to input information. The program PG2 of the terminal device 200 is a program of a web browser.

In S430, the processor 610 of the management server 600 transmits data of the issuance form of the PIN to the terminal device 200. In S435, the processor 210 of the terminal device 200 displays the issuance form (not shown) on the display 240 in accordance with the received data. The issuance form displayed on the display 240 is an example of an input screen for the user to input information.

In S440, the user inputs information for issuing the PIN by operating the operation panel 250 of the terminal device 200. In the modified embodiment, the information as input contains the delivery destination of the consumables, and the management identifier. In the following description, it is assumed that the third delivery destination ADR3 is input as the delivery destination. Further, the user inputs the management identifier (in this case, the first management identifier UID1) notified from the administrator. In S450, the processor 210 of the terminal device 200 transmits a PIN issuance request including data indicating the input information ADR3, EAD1 and UID1 to the management server 600.

In S453, the processor 610 of the management server 600 determines whether the management identifier UID obtained in S450 is an appropriate management identifier UID. In the present embodiment, the processor 610 determines that the management identifier UID is appropriate when the management identifier UID has been registered in the registration table 631 (FIG. 2A). A third party which is not authorized, by the administrator, to register the printer is not informed of an appropriate management identifier UID from the administrator. Therefore, the third party cannot input the registered management identifier UID in S440 (FIG. 4). When the unregistered management identifier UID is input (S453: NO), the processor 610 performs an interruption process for registering the printer 100 (S458). Then, the processor 610 terminates the registration process. It is noted that the interruption process may be any of various processes.

When the management identifier UID has been registered (S453: YES), the processor 610 of the management server 600 transmits, in S460, an issuance request for a provisional registration identifier to the connection server 500. The provisional registration identifier is a temporary registration identifier CID which is not associated with the subscriber identifier LID (FIG. 2A). As will be described later, when the registration of the printer 100 is allowed, the provisional registration identifier is changed to the registration identifier CID which is associated with the subscriber identifier LID. In S470, the processor 510 of the connection server 500 generates the provisional registration identifier. For example, the processor 510 uses random numbers to generate the provisional registration identifier. It is noted that the provisional registration identifier is determined to be an identifier different from the registration identifier CID that has already been registered in the registration table 631 (FIG. 2A). In the following description, it is assumed that the generated provisional registration identifier is a provisional registration identifier CID2. In S480, the processor 510 transmits data indicating the provisional registration identifier CID2 to the management server 600.

In S500, the processor 610 transmits an issuance request for the PIN to the connection server 500. In S510, the processor 510 of the connection server 500 generates the PIN in response to the request. It is noted that the PIN is an example of authentication information to be used in the authentication described later. In the modified embodiment, the PIN is a combination of a plurality of numbers. The processor 510 randomly generates a combination of a plurality of numbers (e.g., the PIN) using random numbers. In the following description, it is assumed that the generated PIN is a code PIN1.

Figures 9A, 9B, 9C:
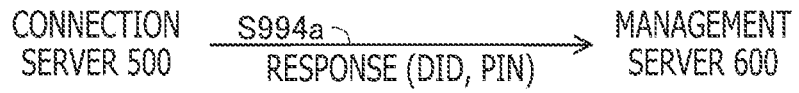

In S520, the processor 510 generates the temporary device table 533. FIG. 9B shows an example of the temporary device table 533. In the modified embodiment, the temporary device table 533 shows a relationship between the registration identifier CID and the PIN. The registration identifier CID is the provisional registration identifier generated in S470. The PIN is the PIN generated in S510. The processor 510 registers a combination of the information CID2 and PIN1 generated in S470 and S510 in the temporary device table 533. The data indicating temporary device table 533 in the storage 515 (e.g., the non-volatile storage 530).

In S530 (FIG. 4), the processor 510 transmits data indicating the PIN generated in S510 (in this case, the code PIN1) in the management server 600.

In S535, the processor 610 of the management server 600 generates the temporary delivery table 634. FIG. 6A shows an example of the temporary delivery table 634. In the modified embodiment, the temporary delivery table 634 indicates a relationship among the subscription identifier ZID, the plan PL, the registration identifier CID, and the delivery destination ADR. The subscription identifier ZID and the plan PL are determined to those associated with the management identifier UID (in this case, the first management identifier UID1) obtained in S450 (FIG. 4). Therefore, the subscription identifier ZID and the plan PL are determined to be the first subscription identifier ZID1 and the first plan PL1. The relationship among the management identifier UID, the subscription identifier ZID and the plan PL is indicated by the registration table 631 (FIG. 2A) and the delivery table 632 (FIG. 2B). The registration identifier CID is the provisional registration identifier obtained in S480. The delivery destination ADR is the email address obtained in S450. The processor 610 registers a combination of the information ZID1, PL1, CID2, and ADR3 in the temporary delivery table 634. The processor 610 stores the data indicating the temporary delivery table 634 in the storage 615 (e.g., the non-volatile storage 630).

In S540, the processor 610 of the management server 600 transmits the display data for displaying the PIN obtained in S530 on the terminal device 200 to the terminal device 200. In the modified embodiment, the display data is data of a web page displaying the PIN.

In S992, the processor 610 transmits an inquiry for the registered device identifier to the connection server 500. The inquiry contains data indicating the provisional registration identifier (in this case, the provisional registration identifier CID2). In S994, the processor 510 of the connection server 500 transmits a response to the inquiry to the management server 600. As will be described, the connection server 500 associates the provisional registration identifier with the device identifier of the printer by validating the printer using the PIN. The registration device identifier indicates the device identifier associated with the provisional registration identifier. As in a case where S994 of FIG. 4 is being executed, the device identifier is not associated with the provisional registration identifier before the printer is validated. In this case, the processor 510 transmits a response indicating that the processor 510 has not been registered to the management server 600. The processor 610 of the management server 600 repeats the inquiry of S992 until a response indicating the registration device identifier is received. In this way, the process S990 including S992 and S994 is repeated.

In S550, the processor 210 of the terminal device 200 displays the PIN on the display 240 using the display data received in S540. The user can recognize the PIN by observing the display 240. In S560 (FIG. 5), the user inputs an enabling instruction of the printing function by operating the operation panel 150 of the printer 100. In this case, the user input the PIN (in this case, the code PIN1) displayed in S550 (FIG. 4). In S570, the processor 110 of the printer 100 transmits a function enabling request for the printer. The function enabling request contains data indicating the PIN input in S560 and the device identifier DID3 of the printer 100.

In S573, the processor 510 of the communication server 500 determines whether the PIN as received has been registered in the temporary device table 533 (FIG. 9B).

When the PIN has not been registered in the temporary device table 533, the processor 510 determines that the authentication is failed (S573: NO), and the processor 510 executes an interruption process of the registration of the printer 100 (S576). Then, the processor 510 terminates the registration process. The interruption process may be various processes. For example, the interruption process may include a process of notifying the management server 600 of the interruption.

When the PIN has been registered in the temporary device table 533 (S573: YES), the processor 510 of the connection server 500 updates the temporary device table 533 (S580) using the information received in S570. FIG. 6C shows an example of the updated temporary device table 533. The temporary device table 533 shows the table that has been updated from the temporary device table 533 shown in FIG. 6B. The processor 510 replaces the code PIN1 in the temporary device table 533 (FIG. 6B) before the update with the device identifier DID3, which is associated with the code PIN1 by the information received in S570. As a result, the updated temporary table 533 (FIG. 6C) shows a relationship between the provisional registration identifier CID2 and the device identifier DID3. As above, the temporary device table 533 indicates whether the device identifier is associated with the provisional registration identifier. When the inquiry in S992 (FIG. 4) is received, the processor 510 may determine the content of the response transmitted in S994 with reference to the temporary device table 533.

In S590 (FIG. 5), the processor 510 establishes the continuous connection with the printer 100.

In S992 after S580, the processor 610 of the management server (management server) 600 inquires the connection server 500 for the registered device identifier. In S994, the processor 510 of the connection server 500 refers to the temporary device table 533 (FIG. 6C) to obtain the device identifier DID3 that is associated with the provisional registration identifier CID2 in the inquiry. Then, the processor 510 transmits a response containing data indicating the device identifier DID3 to the management server 600.

After receiving a response indicating the registered device identifier (FIG. 5: S994), the processor 610 of the management server 600 updates the delivery table 632 in S880. FIG. 6D shows an example of the updated delivery table 632. This delivery table 632 shows a table updated from the delivery table 632 shown in FIG. 2B. As shown in FIG. 6D, the first relationship R1 has been added. The processor 610 determines information ZID, PL, DID and ADR of the first relationship R1 as follows. The subscription identifier ZID, the plan PL and the delivery destination ADR are determined to be the subscription identifier ZID, the plan PL and the delivery destination ADR which are associated with the provisional registration identifier (in this case, the provisional registration identifier CID2) by the temporary delivery table 634 (FIG. 6A). The device identifier DID is determined to be the device identifier DID that is obtained in S994 (FIG. 5) (in this case the third device identifier DID3). It is noted that the registration table 631 (FIG. 2A) may further indicate the plan PL. In such a case, the plan PL of the registration table 631 may be registered in the registration table 631 in response to the subscriber subscribing the printing service. In S880, the processor 610 may obtain the information ZID and PL to be associated with the management identifier UID with reference to the registration table 631.

The updated delivery table 631 (FIG. 6D) and the registration table 631 (FIG. 2A) associates the subscriber identifier LID with the device identifier DID via the subscription identifier ZID. The processor 619 associates the subscriber identifier LID with the device identifier DID by updating the delivery table 632.

In S890 (FIG. 5), the processor 610 transmits a notification containing data indicating the registration identifier CID associated with the newly registered first relationship R1 to the connection server 500. The processor 610 obtains, with reference to the registration table 631 (FIG. 2A), the registration identifier CID associated with the subscription identifier ZID of the first relationship R1 (in this case, the first registration identifier CID1 associated with the first subscription identifier ZID1). This notification further contains data indicating the provisional registration identifier CID2 associated with the first relationship R1.

In S895, the processor 510 of the connection server 500 updates the device table 531. FIG. 6E shows an example of the updated device table 531. This device table 531 shows a table updated from the device table 531 shown in FIG. 2C. As shown in FIG. 6E, the second relationship R2 has been added to the updated device table 531. The processor 510 determines the registration identifier CID of the second relationship R2 to the registration identifier CID1 obtained in S890. The processor 510 determines the device identifier DID of the second relationship R2 to the third device identifier DID3 which is associated with the provisional registration identifier CID2 by the temporary table 533 (FIG. 6C) in S890. Then, the registration process is terminated.

As described above, in the present embodiment, the printer 100 (FIG. 1) is configured to communicate with other devices (e.g., the processing server 700) via the network NT. Such a printer 100 is an example of a communication device (in the following description, the printer 100 will also be referred to as a communication device 100). The processing server 700 is configured to communicate with the administrator's device 300, the terminal device 200 and the communication device 100. In the present embodiment, the processing server 700 includes the connection server 500 and the management server 600. The connection server 500 and the management server 600 share some of functions performed by the processing server system 700.

The connection server 500 and the management server 600 perform the processes indicated below.

In S845 (FIG. 3). The management server 600 obtains a request for the management identifier UID from the administrator's device 300. The management identifier UID is an example of the management information associated with the administrator of the communication device 100. Hereinafter, this request for the management information (in this case, the management identifier UID) will also be referred to as the first request. In S860, the management server 600 transmits the management identifier UID1 to the administrator's device 300 in response to the first request.

In S450 (FIG. 4), the management server 600 obtains the management identifier UID1 from the terminal device 200. The management identifier UID1 obtained from the terminal device 200 is information transmitted by the terminal device 200 based on the management identifier UID1 that is received by the administrator's device 300. In the present embodiment, in S865 (FIG. 3), the administrator's device 300 displays the received management identifier UID1. Then, the administrator informs the user of the management identifier UID1. In S440 (FIG. 4), the user inputs the management identifier UID1 into the terminal device 200. In this way, the management identifier UID1 is transmitted from the administrator's device 300 to the terminal device 200 by the administrator and the user. The terminal device 200 is configured to receive the management identifier UID1 received by the administrator's device 300. Concretely, the terminal device 200 is configured to receive the management identifier UID1 in accordance with a user instruction (in this case, the operation of the operation panel 250).

In S450 (FIG. 4), the management server 600 obtains a request for the PIN from the terminal device 200. The PIN is an example of the authentication information which is information for using the communication device 100. In the following description, this request for the authentication information (in this embodiment, the PIN) will also be referred to as an information request. In S540, the management server 600 transmits a code PIN1 to the terminal device 200.

In S570 (FIG. 5), the connection server 500 obtains the code PIN1 from the communication device 100. The code PIN1 obtained from the communication device 100 is information transmitted by the communication device 100 based on the code PIN1 which is received by the terminal device 200. In the present embodiment, in S550 (FIG. 4), the terminal device 200 displays the received code PIN. In S560 (FIG. 5), the user observes the code PIN1 displayed by the terminal device 200, and inputs the code PIN1 into the communication device 100. In this way, the code PIN1 is informed from the terminal device 200 to the communication device 100 by the user. The communication device 100 is configured to receive the code PIN1 received by the terminal device 200. Concretely, the communication device 100 is configured to receive the code PIN1 in accordance with the user instruction (in this case, the operation of the operation panel 150).

In response to the obtaining of the code PIN1, in S880 (FIG. 5), the management server 600 updates the delivery table 632 (FIG. 6D). In this way, the management server 600 associates the management identifier UID1 obtained from the terminal device 200 with the device identifier DID3 of the communication device 100. In the present embodiment, the management identifier UID1 and the device identifier DID3 are associated with each other by the registration table 631 (FIG. 2A) and the updated delivery table 632 (FIG. 6D).

As described above, when the user of the communication device 100 is different from the administrator of the communication device, the processing server 700 can appropriately associate the management information (in this case, the management identifier UID1) with the device identifier DID3 of the communication device 100.

In S450 (FIG. 4), the management server 600 obtains the delivery destination ADR3 from the terminal device 200. The delivery destination ADR3 is an example of device information to be associated with the communication device 100. In S880 (FIG. 5), the management server 600 associates the device identifier DID3 of the communication device 100 with the delivery destination ADR3 by updating the delivery table 632 (FIG. 6D). In this way, the processing server 700 can appropriately associate the management device with the identification information and device information of the communication device.

The device information to be associated with the communication device 100 contains the delivery destination ADR of the consumable (in this case, the ink) used by the communication device 100. Thus, the processing server 700 can appropriately associate the management information with the identification information of the communication device.

In S540 (FIG. 4), the management server 600 transmits data causing the terminal device 200 to display the PIN, which is an example of the authentication information, to the terminal device 200. The PIN obtained from the communication device 100 in S570 indicates the PIN to be input to the communication device 100 in S560. In this way, the processing server 700 causes the terminal device 200 to display the authentication information, and then, by obtaining the authentication information to be input to the communication device 100, can appropriately associate the management information with the identification information of the communication device.

B. Modified Embodiment (Registration of Multiple Printers)

The registration process shown in FIGS. 4-5 is a process of registering a signal communication device 100. The processing server 700 is configured to perform multiple registration processes for multiple communication devices, respectively. FIGS. 7A-7D show examples of temporary delivery tables 634A and 634B, and temporary tables 533A and 533B. FIGS. 7A-7D show a case where two registration processes for two communication devices proceed in parallel. FIGS. 8A and 8B show an example of the updated tables 632 and 531. In the following description, it is assumed that a first user operates a first terminal device and a first communication device to have the registration process for the first communication device performed. It is further assumed that a second user operates a second terminal device and a second communication device to have the registration process for the second communication device performed. As will be described later, the processing server 700 uses different provisional identifiers for the respective communication devices. In this way, the processing server 700 can perform the registration processes for the first communication device and the second communication device in parallel. It is noted that the management identifier UID1 and the registration locator URLr described with reference to FIG. 3 are used commonly for multiple registration processes. Further, the registration process for each communication device is the same as the registration process illustrated in FIGS. 4-5.

In the registration process for the first communication device, the processing server 700 performs the first process containing multiple processes as follows.
First Process In S450 (FIG. 4), the management server 600 obtains the management identifier UID1 from the first terminal device. In this case, the management identifier UID1 obtained from the first terminal device is information transmitted by the first terminal device based on the management identifier UID1 received by the administrator's device 300.

Further, in S450 (FIG. 4), the management server 600 obtains the first information request indicating a request for the PIN from the first terminal device.

Furthermore, in S450 (FIG. 4), the management server 600 obtains the first device information (in this case, the first delivery destination ADRa) to be associated with the first communication device from the first terminal device.

In S540 (FIG. 4), the management server 600 transmits the first code PINa to the first terminal device.

In S570 (FIG. 5), the connection server 500 obtains the first code PINa from the first communication device. The first code PINa obtained from the first communication device is information transmitted by the first communication device based on the first code PINa received by the first terminal device.

In S880 (FIG. 5), the management server 600 updates the delivery table 632 (FIG. 8A) in response to acquisition of the first code PINa. In this way, the management server 600 associates the management identifier UID1 obtained from the first terminal device, the first device identifier DIDa of the first communication device and the first delivery destination ADRa with each other. In the present embodiment, the management identifier UID1, the device identifier DIDa and the first delivery destination ADRa are associated with each other by the registration table 631 (FIG. 2A) and the updated delivery table 632 (FIG. 8A).

The temporary delivery table 634A of the FIG. 7A indicates a table generated in S535 (FIG. 4). This temporary delivery table 634A indicates a subscriber identifier LID, in addition to information ZID, PL, CID and ADR of the temporary delivery table 634 shown in FIG. 6A. As above, the subscriber identifier LID may be added to the temporary delivery table 634A (however, the subscriber identification LID may be omitted). The information LID, ZID and PL are determined to be information LID1, ZID1 and PL1 associated with the first management identifier UID1 obtained in S450 (FIG. 4). The registration identifier CID is determined to be a first provisional registration identifier CIDa obtained in S480 (FIG. 4), and the delivery destination ADR is determined to be a first delivery destination ADRa obtained in S450.

The temporary device table 533A shown in FIG. 7A indicates a table generated in S520 (FIG. 4). The registration identifier CID is determined to be a first provisional registration identifier CIDa generated in S470, and the PIN is determined to be a first code PINa generated in S510.

The temporary table 533A of FIG. 7C indicates the temporary device table 533A updated in S580 (FIG. 5). In the updated temporary device table 533A, the first code PINa of the temporary device table 533A (FIG. 7A) before the update has been replaced with the first device identifier DIDa.

The temporary delivery table 634A of FIG. 7C indicates the temporary delivery table 634A that is updated for updating, in S880 (FIG. 5), the delivery table 632 (FIG. 8A). In the updated delivery table 634A, the first provisional registration identifier CIDa of the temporary delivery table 634A (FIG. 7A) before updating has been replaced with the first device identifier DIDa. The management server 600 confirms the relationship between the first provisional registration identifier CIDa and the first device identifier DIDa in S992 and S994 (FIG. 5).

In S880 (FIG. 5), the management server 600 updates the delivery table 632 (FIG. 8A) using the updated temporary delivery table 634A (FIG. 7C). By the update, a first relationship R1a indicating the information of the first communication device is added. The first relationship R1a is the same as the relationship indicated by the updated temporary delivery table 634A (FIG. 7C). By the updated delivery table 632 and the registration table 631 (FIG. 2A), the management identifier UID1 and the first device identifier DIDa of the first communication device are associated. The delivery destination ADR is set to be the first delivery destination ADRa. It is noted that the management server 600 may update the delivery table 632 without updating the temporary delivery table 634A as described with reference to FIGS. 4 and 5.

The device table 531 shown in FIG. 8B indicates the device table 531 updated in S895 (FIG. 5). In the updated device table 531, the first relationship R2a indicating the information of the first communication device has been added. The registration identifier CID is determined to be the registration identifier CID1 obtained in S890. The device identifier CID is determined to be the first device identifier DIDa associated with the first provisional registration identifier CIDa obtained in S890 by the temporary device table 533A (FIG. 7C).

The registration process for the second communication device is the same as the registration process for the first communication device except that the provisional registration identifier CIDb, the code PINb, the device identifier DIDb and the delivery destination ADRb are different from those (i.e., the provisional registration identifier CIDa, the code PINa, the device identifier DIDa and the delivery destination ADRa) for the first communication device. In the registration process for the second communication device, the processing server 700 performs a second process indicated below.

Second Process

In S450 (FIG. 4), the management server 600 obtains the management identifier UID1 from the second terminal device. In this case, the management identifier UID1 obtained from the second terminal device is information transmitted by the second terminal device based on the management identifier UID1 received by the administrator's device 300.

Further, in S450 (FIG. 4), the management server 600 obtains the second information request indicating a request for the PIN from the second terminal device.

Furthermore, in S450 (FIG. 4), the management server 600 obtains the second device information (in this case, the second delivery destination ADRb) to be associated with the second communication device from the second terminal device.

In S540 (FIG. 4), the management server 600 transmits the second code PINb to the second terminal device.

In S570 (FIG. 5), the connection server 500 obtains the second code PINb from the second communication device. The second code PINb obtained from the second communication device is information transmitted by the second communication device based on the second code PINb received by the second terminal device.

In S880 (FIG. 5), the management server 600 updates the delivery table 632 (FIG. 8A) in response to acquisition of the second code PINb. In this way, the management server 600 associates the management identifier UID1 obtained from the second terminal device, the second device identifier DIDb of the second communication device and the second delivery destination ADRb with each other. In the present embodiment, the management identifier UID1, the device identifier DIDb and the second delivery destination ADRb are associated with each other by the registration table 631 (FIG. 2A) and the updated delivery table 632 (FIG. 8A).

The tables 634B and 533B of FIG. 7B are generated for the second communication device. Methods of generating the tables 634B and 533B are the same as the generation methods for the tables 634A and 533A for the first communication device, respectively. In this case, the registration identifier CID is set to a second provisional registration identifier CIDb, the delivery destination ADR is set to a second delivery destination ADRb, and the PIN is set to a second code PINb. In S470 (FIG. 4), the processor 510 of the connection server 500 generates the provisional identifier using the random number. Therefore, the second provisional registration identifier CIDb is different from the first provisional registration identifier CIDa. In S510 (FIG. 4), the processor 510 randomly generates the PIN. Therefore, the second clod PINb is different from the first code PINa.

Tables 634B and 533B shown in FIG. 7D are tables updated from the tables 634B and 533B shown in FIG. 7B. The updating method of the tables 634B and 533B are the same as the methods of updating the tables 634A and 533A for the first communication device (FIG. 7C), respectively. The second provisional registration identifier CIDb of the temporary delivery table 634B (FIG. 7B) before the update is replaced with the second device identifier DIDb by the update. The second code PINb of the temporary table 533B (FIG. 7B) before the update is replaced with the second device identifier DIDb by the update.

In S880 (FIG. 5), the management server 600 updates the delivery table 632 (FIG. 8A) using the updated temporary delivery table 634B (FIG. 7D). By the update, a second relationship R1b indicating information of the second communication device is added to the delivery table 632. It is noted that the second relationship R1b is the same as the relationship indicated by the update temporary delivery table 634B (FIG. 7D). By the updated delivery table 632 and the registration table 631 (FIG. 2A), the management identifier UID1 and the second device identifier DIDb of the second communication device are associated. The delivery destination ADR is set to the second delivery destination ADRb.

In S895 (FIG. 5), the connection server 500 updates the device table 531 (FIG. 8B). By the update, a second relationship R2b indicating information on the second communication device is added. The registration identifier CID is determined to be the registration identifier CID1 obtained in S890. The device identifier DID is determined to be the second device identifier DIDb which is associated, by the temporary device table 533C (FIG. 7D), with the second provisional registration identifier CIDb obtained in S890.

As above, the processing server 700 can appropriately register the relationship between the management identifier UID1 and the first device identifier DIDa of the first communication device, and the relationship between the management identifier UID1 and the second device identifier DIDb of the second communication device. When three or more registration processes for three or more communication devices proceed in parallel, the processing server 700 can still appropriately register the information for each communication device.

In the present embodiment, the processing server 700 uses different provisional registration identifiers for respective communication devices in order to proceed with multiple registration processes in parallel. In the registration process for the first communication device, the processing server 700 performs the following multiple processes.

In S470 (FIG. 4), the connection server 500 determines the first provisional registration identifier CIDa. The first provisional registration identifier CIDa is an example of request identification information to identify a registration request.

In S510 (FIG. 4), the connection server 500 determines the first code PINa. As described with reference to FIG. 7A, the first provisional registration identifier CIDa is associated with the first code PINa.

In S535 (FIG. 4), the management server 600 generates the temporary delivery table 634A (FIG. 7A). Then, the management server 600 associates the first provisional registration identifier CIDa with the first delivery destination ADRa.

In S570 (FIG. 5), the connection server 600 obtains the first code PINa and the first device identifier DIDa of the first communication device from the first communication device.

In S580 (FIG. 5), the connection server 500 updates the temporary device table 533A (FIG. 7C). Then, the connection server 500 associates the first provisional registration identifier CIDa, which is associated with the first code PINa obtained from the first communication device, with the first device identifier DIDa obtained from the first communication device.

In S880 (FIG. 5), the management server 600 updates the delivery table 632 (FIG. 8A). Then, the management server 600 associates the first management identifier UID1 obtained from the first terminal device (FIG. 4: S450) with the first device identifier DIDa and the first delivery destination ADRa associated with the first provisional registration identifier CIDa. It is noted that the first device identifier DIDa and the first delivery destination ADRa are associated with the first provisional registration identifier CIDa by the updated tables 634A and 533A (FIG. 7C).

In the registration process for the second communication device, the processing server 700 performs processes indicated below.

In S470 (FIG. 4), the connection server 500 determines the second provisional registration identifier CIDb. The second provisional registration identifier CIDb is an example of the request identification information to identify a registration request.

In S510 (FIG. 4), the connection server 500 determines the second code PINb. As described with reference to FIG. 7B, the second provisional registration identifier CIDb is associated with the second code PINb.

In S535 (FIG. 4), the management server 600 generates the temporary delivery table 634B (FIG. 7B). Then, the management server 600 associates the second provisional registration identifier CIDb with the second delivery destination ADRb.

In S570 (FIG. 5), the connection server 600 obtains the second code PINb and the second device identifier DIDb of the second communication device from the second communication device.

In S580 (FIG. 5), the connection server 500 updates the temporary device table 533A (FIG. 7D). Then, the connection server 500 associates the second provisional registration identifier CIDb, which is associated with the second code PINb obtained from the second communication device, with the second device identifier DIDb obtained from the second communication device.

In S880 (FIG. 5), the management server 600 updates the delivery table 632 (FIG. 8A). Then, the management server 600 associates the first management identifier UID1 obtained from the second terminal device (FIG. 4: S450) with the second device identifier DIDb and the second delivery destination ADRb associated with the second provisional registration identifier CIDb. It is noted that the second device identifier DIDb and the second delivery destination ADRb are associated with the second provisional registration identifier CIDb by the updated tables 634B and 533B (FIG. 7D).

As described above, the processing server 700 uses different provisional registration identifiers for respective communication devices. Thus, the processing server 700 can appropriately register the relationship between the management identifier UID1 and the first device identifier DIDa of the first communication device, and the relationship between the management identifier UID1 and the second device identifier DIDb of the second communication device. When three or more registration processes for three or more communication devices proceed in parallel, the processing server 700 can appropriately register the information for each communication device.

C. Another Modified Embodiment (Registration of Multiple Printers)

The processing server 700 may proceed with multiple registration processes for multiple communication devices in parallel, using different PINs for different communication devices instead of provisional registration identifiers. FIG. 9A illustrates a modified portion of the registration process from the process shown in FIGS. 4-5. In the present embodiment, S994 (FIG. 5) is replaced with S994a shown in FIG. 9A. In S994a, when the provisional registration identifier is associated with the device identifier, the processor 510 of the connection server 500 transmits, in addition to the device identifier DID, data indicating the PIN to the management server 600. In S880 (FIG. 5), the processor 610 of the management server 600 updates the delivery table 632 using the PIN obtained in S994a. The other portion of the registration process according to the present embodiment is the same as those shown in FIGS. 4-5.

FIGS. 9B-9E show an example of temporary delivery tables 634C, 634D, and temporary device tables 533C and 533D. FIGS. 9B-9E show a case where to registration processes for two communication devices are performed in parallel. In the following description, it is assumed that the first user operates the first terminal device and the first communication device to perform a registration process for the first communication device. Further, it is assumed that the second user operates the second terminal device and the second communication device to perform a registration process for the second communication device. As will be described later, the processing server 700 uses different PINs for different commination devices. Therefore, the processing server 700 can perform the registration process for the first communication device and the registration process for the second communication process in parallel. It is noted that the management identifier UID1 and the registration locater URLr described with reference to FIG. 3 are used commonly among multiple registration processes.

In the registration process for the first communication device, the processing server 700 performs the first process described in the modified embodiment.

The temporary table 634C shown in FIG. 9B indicates a table generated in S535 (FIG. 4). The temporary delivery table 634C indicates the PIN in addition to the information LID, ZID, PL, CID and ADR which are indicated in the temporary delivery table 634A shown in FIG. 7C. The information LID, ZID and PL are determined to be information LID1, ZID1 and PL1 which are associated with the first management identifier UID1 obtained in S450 (FIG. 4). Further, the registration identifier CID is determined to be the first provisional registration identifier CIDc obtained in S480 (FIG. 4) and the delivery destination ADR is determined to be the first delivery destination ADRa obtained in S450. Furthermore, the PIN is determined to be the first code PINa obtained in S530.

The temporary device table 533C shown in FIG. 9B indicates a table generated in S520 (FIG. 4). The registration identifier CID is determined to be a first provisional registration identifier CIDc generated in S470, and the PIN is determined to be a first code PINa generated in S510.

The temporary device table 533C shown in FIG. 9D indicates the temporary device table 533C updated in S580 (FIG. 5). The updated temporary device table 533C is configured such that the first device identifier DIDa has been added to the temporary device table 533C before the update (FIG. 9B).

The temporary delivery table 634C shown in FIG. 9D shows the temporary delivery table 634C that is updated for updating the delivery table 632 (FIG. 8A) in S880 (FIG. 5). In the updated temporary delivery table 634C (FIG. 9D), the first registration identifier CIDc in the temporary delivery table 634 before the update (FIG. 9B) has been replaced with the first device identifier DIDa. A response (FIG. 9A: S994a) to S993 (FIG. 5) contains the first code PINa and the first device identifier DIDa. The management server 600 replaces the first provisional registration identifier CIDc of the temporary delivery table 634C (FIG. 9B) associated with the first code PINa with the first device identifier DIDa.

In S880 (FIG. 5), the management server 600 updates the delivery table 632 (FIG. 8A) using the updated temporary delivery table 634C (FIG. 9D). By the update, the first relationship R1a indicating information on the first communication device is added to the delivery table 632. The first relationship R1a is the same as the relationship indicated by the updated temporary delivery table 634C (FIG. 9D).

In S895 (FIG. 5), the connection server 500 updates the device table 531 (FIG. 8B). By the update, the first relationship R2a indicating the information on the first communication device is added to the device table 531. In S890 (FIG. 5), the management server 600 may transmit, in addition to the first registration identifier CID1 and the first provisional registration identifier CIDc, the first code PINa. The connection server 500 may refer to the temporary device table 533C associated with the first code PINa (FIG. 9D) to determine the device identifier DID of the device table 531 (FIG. 8B) to be the first device identifier DIDa.

The registration process for the second communication device is the same as that for the first communication device, except that the code PINb, device identifier DIDb, and delivery destination ADRb are different from those of the first communication device. In the registration process for the second communication device, the processing server 700 performs the second process described in the modified embodiment.

The tables 634D and 533D shown in FIG. 9C are generated for the second communication device. The method of generating the tables 634D and 533D is the same as the method of generating the tables 634C and 533C (FIG. 9B) for the first communication device, respectively. In this case, the registration identifier CID is set to the first temporary registration identifier CIDc, the delivery address ADR is set to the second delivery address ADRb, and the PIN is set to the second code PINb. In S510 (FIG. 4), the processor 510 randomly generates the PIN. Therefore, the second code PINb is different from the first cod PINa. The first provisional registration identifier CIDc and the first provisional registration identifier CIDc for the first communication device are the same. As above, according to the present embodiment, the first provisional registration identifier CIDc may be commonly used among multiple communication devices.

The tables 634D and 533D in FIG. 9E are tables updated from the tables 634D and 533D in FIG. 9C. The method of updating the tables 634D and 533D is the same as the method of updating the tables 634C and 533C (FIG. 9D) for the first communication device, respectively. In the updated temporary delivery table 634D, the first provisional registration identifier CIDc in the temporary delivery table 634D (FIG. 9C) before the update is replaced with the second device identifier DIDb. The response (FIG. 9A: S994a) to S992 contains the second code PINb and the second device identifier DIDb. The management server 600 replaces the first provisional registration identifier CIDc in the temporary delivery table 634D (FIG. 9C), which is associated with this second code PINb, with the second device identifier DIDb.

In S880 (FIG. 5), the management server 600 updates the delivery table 632 (FIG. 8A) using the updated temporary delivery table 634 (FIG. 9E). By the updated, the second relationship R1b indicating the information on the second communication device is added to the delivery table 632. The second relationship R1b is the same as the relationship indicated by the updated temporary delivery table 634D (FIG. 9E).

In S895 (FIG. 5), the connection server 500 updates the device table 531 (FIG. 8B). By the update, the second relationship R2b indicates the information on the second communication device is added to the device table 531. In S890 (FIG. 5), the management server 600 may transmit, in addition to the first registration identifier CID1 and the first provisional registration identifier CIDc, the second code PINb. The connection server 500 may refer to the temporary device table 533D (FIG. 9E) associated with the second code PINb, and determine the device identifier DID of the device table 531 (FIG. 5) to be the second device identifier DIDb.

As described above, the processing server 700 can appropriately register the relationship between the management identifier UID1 and the first device identifier DIDa of the first communication device and the relationship between the management identifier UID1 and the second device identifier DIDb of the second communication device. When three or more registration processes for three or more communication devices proceed in parallel, the processing server 700 can appropriately register the information for each communication device.

In the present embodiment, the processing server 700 uses different PINs for different communication devices in order to perform multiple registration processes in parallel.

In the registration process for the first communication device, the processing server 700 performs the multiple processes indicated below.

In S535 (FIG. 4), the management server 600 generates the temporary delivery table 634C (FIG. 9B). Then, the first code PINa is associated with the first delivery destination ADRa.

In S570 (FIG. 5), the connection server 500 obtains the first code PINa and the first device identifier DIDa of the first communication device from the first communication device.

In S880 (FIG. 5), the management server 600 updates the delivery table 632 (FIG. 8A) in response to acquisition of the first code PINa and the first device identifier DIDa. Then, the management server 600 associates the device information UID1 obtained from the first terminal device and the first delivery destination ADRa associated with the first code PINa obtained from the first communication device. In the present embodiment, by the registration table 631 (FIG. 2A) and the updated delivery table 632 (FIG. 8A), the management identifier UID1 is associated with the device identifier DIDa and the first delivery destination ADRa.

In the registration process for the second communication device, the multiple processes indicated below will be performed.

In S535 (FIG. 4), the management server 600 generates the temporary delivery table 634D (FIG. 9C). Then, the second code PINb is associated with the second delivery destination ADRb.

In S570 (FIG. 5), the connection server 500 obtains the second code PINb and the second device identifier DIDb of the second communication device from the second communication device.

In S880 (FIG. 5), the management server 600 updates the delivery table 632 (FIG. 8A) in response to acquisition of the second code PINb and the second device identifier DIDb. Then, the management server 600 associates the device information UID1 obtained from the second terminal device and the second delivery destination ADRb associated with the second code PINb obtained from the second communication device. In the present embodiment, by the registration table 631 (FIG. 2A) and the updated delivery table 632 (FIG. 8A), the management identifier UID1 is associated with the device identifier DIDb and the second delivery destination ADRb.

As described above, the processing server 700 uses different authentication information (in this case, PIN) for different communication devices. In this way, the processing server 700 can appropriately register the relationship between the management identifier UID1 and the first device identifier DIDa of the first communication device and the relationship between the management identifier UID1 and the second device identifier DIDb of the second communication device. When three or more registration processes for three or more communication devices are proceeding in parallel, the processing server 700 can also appropriately register the information of each communication device.

D. Further Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limit the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(1) The delivery destination ADR (FIG. 2B, FIG. 6A, FIG. 6D) is not necessarily limited to the delivery destination of the ink, but can be the delivery destination of any consumable used by the communication device (e.g., the printer 100), such as printing sheets, toner, photosensitive drum, and the like. For example, the device information may contain information on a payment method of a fee for printing services. It is noted that the device information may be omitted from the information that is registered in association with the device identifier DID.

(2) The authentication information may be any information instead of the PIN. For example, the authentication information may be an image such as a geometric pattern or a photograph. In either case, instead of newly generating the authentication information (FIG. 4: S510), the processing server 700 may select the authentication information to be used from among multiple pieces of authentication information determined in advance. As above, the processing server 700 may be configured to determine the authentication information to be used based on any of various processes such as a generating process, a selection process and the like. Alternatively, the authentication information may be information determined in advance. In such a case, the processing server 700 may be configured such that, when the registration process of one communication device is being performed, the registration processes for other communication devices are prohibited.

(3) The management information, which is the information to be associated with the administrator, may be any other information instead of the management identifier UID. For example, the management information may be an image such as a geometric pattern or a photograph. In any case, the processing server 700 may select management information to be used from among a plurality of pieces of management information that are determined in advance instead of newly generating the management information (FIG. 3: S850). As such, the processing server 700 may determine the management information to be used by various processes, such as generation, selection, and the like. Alternatively, the management information may be information having been determined in advance.

(4) The method of transmitting the management information from the administrator device 300 to the terminal device 200 may be any method. For example, the administrator device 300 may display an image (e.g., bar code or QR code (registered trademark of DENSO WAVE)) indicating management information, and the terminal device 200 may obtain the management information by reading the displayed image with a digital camera.

(5) The method of transmitting the authentication information (e.g., PIN) from the terminal device 200 to the communication device 100 may be any method. For example, the terminal device 200 may display an image indicating authentication information (e.g., bar code or QR code (registered trademark)), and the communication device 100 may acquire authentication information by reading the displayed image with a digital camera. The terminal device 200 may further transmit data indicating authentication information to the communication device 100 via the network. In either case, the communication device 100 may be configured to obtain authentication information in response to an operation by the user.

(6) The process of registering information related to the communication device to the processing server 700 may be various other processes instead of the processes of each of the above embodiments and the modifications. For example, the establishment of a continuous connection between the processing server 700 and the communication device 100 may be omitted.

The processing server 700 may be configured to perform the following processes:

A process of obtaining the first request indicating a request for information associated with the administrator of the communication device 100 from the administrator's device 300 (e.g., FIG. 3: S845).

A process of transmitting, in response to the first request, management information associated with the administrator to the administrator's device (e.g., S860).

A process of obtaining the management information from the terminal device 200 (e.g., FIG. 4: S450). In this case, the management information obtained from the terminal device 200 is information transmitted by the terminal device 200 based on the management information received by the administrator's device 300.

A process of obtaining an information request from the terminal device 200 indicating a request for information for use of the communication device 100 (e.g., FIG. 4: S450).

A process of transmitting the authentication information which is information for use of the communication device 100 (e.g., S540) to the terminal device 200 will be described.

A process of obtaining the authentication information from the communication device 100 (e.g., FIG. 5: S570). In this case, the authentication information obtained from the communication device 100 is information transmitted by the communication device 100 based on the authentication information received by the terminal device 200.

A process of associating, in response to acquisition of the authentication information, the management information obtained from the terminal device 200 and the identification information of the communication device 100 (e.g., FIG. 5: S880).

Any of the above processes may include a plurality of processes. The process of S450 in FIG. 4 includes the process of obtaining the management information and the process of obtaining the information request. As such, a single process may include multiple processes. Further, one or more of the above processes may be omitted from the processes performed by the processing server 700. For example, the communication device, the terminal device or the administrator's device may perform one or more of the above processes. The processing server 700 may be configured to further perform various processes in addition to the above processes.

(7) The communication device may be a variety of devices configured to perform particular functions in place of the printer 100. For example, the communication device may be a scanner configured to optically read an object. In any case, it is preferable that the processing server 700 associates the management information with the identification information of the communication device. Such an association can be used in various services. For example, the service provider may provide a cloud storage facility to subscribers for storing image data generated by scanners. The processing server 700 may allow scanners having identification information that is associated with the management information to use the cloud storage.

(8) A single server device may provide all the functions of the processing server 700. In such a case, a single server device may perform both the functions of the connection server 500 and the management server 600. It is noted that, in such a case, the communication process between the connection server 500 and the management server 600 is omitted. The tables 631, 632, and 531 (FIGS. 2A-2C) may be aggregated into a single table. Furthermore, multiple devices (e.g., computers) that can communicate with each other via a network may share some of the functions of the registration process performed by the processing server and, as a whole, provide the functions of the registration process (a system equipped with these devices corresponds to a server). The various relationships (e.g., the relationship between the management identifier UID and the device identifier DID) may be indicated by multiple pieces of data. For example, relationships may be indicated by multiple pieces of data distributed across multiple devices.

In each of the above-described embodiment, modified embodiment and modifications, a part of the configuration realized by hardware may be replaced with software, or conversely, a part or all of the configuration realized by software may be replaced with hardware. For example, the function of generating the PIN (S510) in FIG. 4 may be realized by a dedicated hardware circuit.

When some or all of the functions according to aspects of the present disclosures are realized by a computer program, the program can be provided in a form stored in a computer-readable recording medium (e.g., a non-transitory recording medium). The program may be used in the same or a different recording medium (computer-readable recording medium) as when provided. The term "computer-readable recording medium" is not necessarily limited to portable recording media such as memory cards and/or CD-ROMs, but can also include internal storage devices in computers, such as various ROMs, and external storage devices connected to the computer, such as hard disk drives.

The embodiment, modified embodiment and modifications described above are intended to facilitate understanding of aspects of the present disclosures and are not intended to limit the same. The aspects of the present disclosures may be changed and/or improved without departing from its intent, and the aspects of the present disclosures include equivalents thereof.

The technology disclosed above can be realized in various forms, such as a method of processing data and a device (e.g., a server) configured to process data, a computer program realizing the functions of the method or device, a recording medium containing such a computer program (e.g., a non-transitory computer-readable recording medium).

What is claimed is:

1. A server for a communication system including an administrator's device, a terminal device and a communication device, the server being communicable with the administrator's device, the terminal device and the communication device, the server has a controller having hardware, the controller being configured to perform: first obtaining, from the administrator's device, a first request indicating a request for information associated with an administrator of the communication device; first transmitting, in response to the first request, management information which is information associated with the administrator to the administrator's device; second obtaining, from the terminal device, the management information, the management information obtained from the terminal device being information transmitted by the terminal device based on the management information received by the administrator's device; third obtaining, from the terminal device, an information request indicating a request for information for use of the communication device; second transmitting, to the terminal device, authentication information that is information for use of the communication device; fourth obtaining the authentication information from the communication device, the authentication information obtained from the communication device being information transmitted by the communication device based on the authentication information received by the terminal device; performing authentication using the authentication information obtained from the fourth obtaining; and if the authentication is successful, first associating the management information obtained from the terminal device with identification information of the communication device.

2. The server according to claim 1,
wherein the controller is further configured to perform fifth obtaining, from the terminal device, device information that is information to be associated with the communication device, and
wherein the first associating further associating the identification information of the communication device with the device information.

3. The server according to claim 2,
wherein the device information contains a delivery destination of a consumable used by the communication device.

4. The server according to claim 2,
wherein the second obtaining obtains:
the management information from a first terminal device, the management information obtained from the first terminal device is information transmitted by the first terminal device based on the management information received by the management device; and
the management information from a second terminal device, the management information obtained from the second terminal device is information transmitted by the second terminal device based on the management information received by the management device,
wherein the third obtaining obtains:
from the first terminal device, first information request indicating a request for information for use of a first communication device; and
from the second terminal device, second information request indicating a request for information for use of a second communication device,
wherein the fifth obtaining obtains:
from the first terminal device, first device information that is information to be associated with the first communication device; and
from the second terminal device, second device information that is information to be associated with the second communication device,
wherein the second transmitting transmits:
to the first terminal device, first authentication information that is information for use of the first communication device; and
to the second terminal device, second authentication information that is information for use of the second communication device,
wherein the fourth obtaining obtains:
the first authentication information from the first communication device, the first authentication information obtained from the first communication device being information transmitted by the first communication information based on the first authentication information received by the first terminal device; and
the second authentication information from the second communication device, the second authentication information obtained from the second communication device being information transmitted by the second communication information based on the second authentication information received by the second terminal device,
wherein the first associating associates:
based on obtaining of the first authentication information, associate the management information obtained from the first terminal device, first identification information of the first communication device, and the first device information; and
based on obtaining of the second authentication information, associate the management information obtained from the second terminal device, second identification information of the second communication device, and the second device information.

5. The server according to claim 4,
wherein the controller is further configured to perform:
determining the first authentication information, first request identification information associated with the first authentication information; and
second associating the first request identification information with the first device information, and the second request identification information with the second device information,
wherein the fourth obtaining obtains:
from the first communication device, the first authentication information and the first identification information of the first communication device; and
from the second communication device, the second authentication information and the second identification information of the second communication device, wherein the controller is further configured to perform third associating:
the first request identification information associated with the first authentication information obtained from the first communication device with the first identification information obtained from the first communication device; and
the second request identification information associated with the second authentication information obtained from the second communication device with the second identification information obtained from the second communication device, and
wherein the first associating associates:
the management information obtained from the first terminal device with the first identification information and the first device information associated with the first request identification information; and
the management information obtained from the second terminal device with the second identification information and the second device information associated with the second request identification information.

6. The server according to claim 4,
wherein the controller is configured to perform second associating the first authentication information with the first device information, and the second authentication information with the second device information,
wherein the fourth obtaining obtains:
from the first communication device, the first authentication information and the first identification information of the first communication device; and
from the second communication device, the second authentication information and the second identification information of the second communication device,
wherein the first associating associates:
in response to obtaining of the first authentication information and the first identification information, the management information obtained from the first terminal device, the first device information associated with the first authentication information obtained from the first communication device, and the first identification information; and
in response to obtaining of the second authentication information and the second identification information, the management information obtained from the second terminal device, the second device information associated with the second authentication information obtained from the second communication device, and the second identification information.

7. The server according to claim 1,
wherein the second transmitting transmits data causing the terminal device to display the authentication information to the terminal device, and
wherein the authentication information obtained from the communication device indicates the authentication information to be input into the communication device.

8. A non-transitory computer-readable recording medium for a server for a communication system including an administrator's device, a terminal device and a communication device, the server being communicable with the administrator's device, the terminal device and the communication device, the server has a controller having hardware, the recording medium containing computer-executable instructions which cause, when executed by the controller, the server to perform: first obtaining, from the administrator's device, a first request indicating a request for information associated with an administrator of the communication device; first transmitting, in response to the first request, management information which is information associated with the administrator to the administrator's device; second obtaining, from the terminal device, the management information, the management information obtained from the terminal device being information transmitted by the terminal device based on the management information received by the administrator's device; third obtaining, from the terminal device, an information request indicating a request for information for use of the communication device; second transmitting, to the terminal device, authentication information that is information for use of the communication device; fourth obtaining the authentication information from the communication device, the authentication information obtained from the communication device being information transmitted by the communication device based on the authentication information received by the terminal device; performing authentication using the authentication information obtained from the fourth obtaining; and if the authentication is successful, first associating the management information obtained from the terminal device with identification information of the communication device.

9. The server according to claim 1,
wherein, if the authentication fails, the controller is configured to stop processing before the first associating.

10. The non-transitory computer-readable recording medium according to claim 8,
wherein, if the authentication fails, then the computer-executable instructions, when executed by the controller, cause the server to stop performing before the first associating.

* * * * *